US012762818B2

(12) United States Patent
Mimoun et al.

(10) Patent No.: US 12,762,818 B2
(45) Date of Patent: Oct. 13, 2026

(54) METHOD FOR CONTROLLING A MOTOR VEHICLE LIGHTING SYSTEM

(71) Applicant: VALEO VISION, Bobigny Cedex (FR)

(72) Inventors: Mickael Mimoun, Bobigny Cedex (FR); Rezak Mezari, Bobigny Cedex (FR); Hafid El Idrissi, Bobigny Cedex (FR); Yasser Almehio, Bobigny Cedex (FR)

(73) Assignee: VALEO VISION, Bobigny Cedex (FR)

( * ) Notice: Subject to any disclaimer, the term of this patent is extended or adjusted under 35 U.S.C. 154(b) by 319 days.

(21) Appl. No.: 18/547,902

(22) PCT Filed: Feb. 25, 2022

(86) PCT No.: PCT/EP2022/054886
§ 371 (c)(1),
(2) Date: Aug. 25, 2023

(87) PCT Pub. No.: WO2022/180253
PCT Pub. Date: Sep. 1, 2022

(65) Prior Publication Data

US 2024/0135666 A1 Apr. 25, 2024
US 2024/0233301 A9 Jul. 11, 2024

(30) Foreign Application Priority Data

Feb. 26, 2021 (FR) ..................................... 21 01882

(51) Int. Cl.
*G06T 7/70* (2017.01)
*G06V 10/141* (2022.01)
(Continued)

(52) U.S. Cl.
CPC .............. *G06V 10/141* (2022.01); *G06T 7/70* (2017.01); *G06V 10/145* (2022.01);
(Continued)

(58) Field of Classification Search
CPC .. G06V 10/141; G06V 10/145; G06V 10/764; G06V 20/56; G06T 7/70;
(Continued)

(56) References Cited

U.S. PATENT DOCUMENTS

2009/0045323 A1* 2/2009 Lu ........................ G06V 20/588 250/208.1
2012/0226411 A1 9/2012 Kuoch et al.
(Continued)

FOREIGN PATENT DOCUMENTS

CN 102139658 A 8/2011
CN 107128240 A 9/2017
FR 2 947 223 A1 12/2010

OTHER PUBLICATIONS

International Search Report issued Jun. 27, 2022 in PCT/EP2022/054886, filed on Feb. 25, 2022, 2 pages.
(Continued)

*Primary Examiner* — Syed Haider
(74) *Attorney, Agent, or Firm* — Oblon, McClelland, Maier & Neustadt, L.L.P.

(57) ABSTRACT

A method for controlling a lighting system for a motor vehicle having a system for detecting objects includes defining at least one set of detectable types of objects and acquiring, by means of the detection system, a set of data relating to the position of a plurality of objects of types belonging to the set. Also included is determining a lighting model which is associated with said set and defines at least one zone referred to as the initial detection zone, and a light pattern referred to as the initial light pattern, of a light beam intended to be emitted in the initial detection zone. The lighting system is controlled in order to emit a light beam having the initial light pattern in the initial detection zone of said lighting model.

19 Claims, 4 Drawing Sheets

Figure 1:
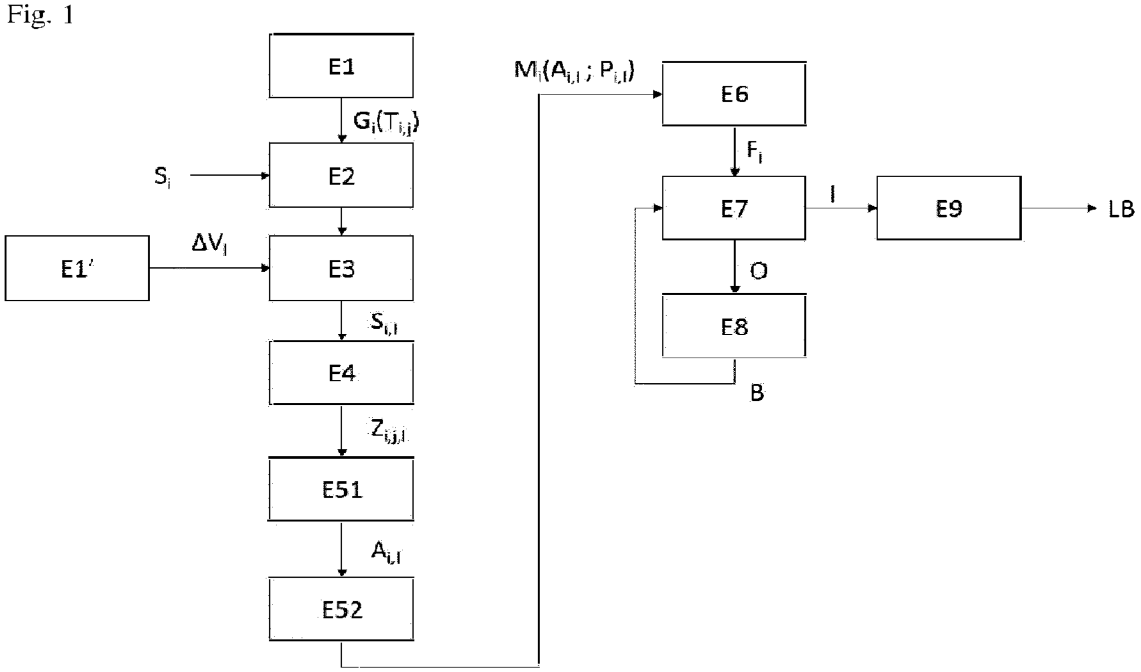

(51) Int. Cl.
*G06V 10/145* (2022.01)
*G06V 10/764* (2022.01)
*G06V 20/56* (2022.01)
*B60Q 1/14* (2006.01)

(52) U.S. Cl.
CPC ............ *G06V 10/764* (2022.01); *G06V 20/56* (2022.01); *B60Q 1/143* (2013.01); *G06T 2207/20081* (2013.01); *G06T 2207/30252* (2013.01)

(58) Field of Classification Search
CPC G06T 2207/20081; G06T 2207/30252; B60Q 1/143
See application file for complete search history.

(56) References Cited

U.S. PATENT DOCUMENTS

| | | | | |
|---|---|---|---|---|
| 2014/0036080 | A1* | 2/2014 | Schut | H04N 7/18 348/148 |
| 2015/0003087 | A1* | 1/2015 | Futamura | B60Q 9/008 362/466 |
| 2018/0178652 | A1* | 6/2018 | Monroe | B60Q 3/80 |
| 2019/0152379 | A1* | 5/2019 | Biswal | B60Q 1/143 |
| 2021/0046862 | A1* | 2/2021 | Wang | G06V 20/584 |
| 2021/0162916 | A1* | 6/2021 | Ikenouchi | B60Q 1/143 |

OTHER PUBLICATIONS

Office Action mailed Dec. 5, 2025, in Chinese Application No. 202280017299.4 filed Feb. 25, 2022 (w/English translation).

* cited by examiner

METHOD FOR CONTROLLING A MOTOR VEHICLE LIGHTING SYSTEM

The invention relates to the field of motor vehicle lighting. The invention relates more specifically to a lighting system for a motor vehicle.

Modern motor vehicles are increasingly often tending to be equipped with systems for partially or fully autonomous driving. This type of system is intended to replace the human driver of the vehicle, during only part of their journey under certain conditions, in particular speed or environment conditions, or during the whole of their journey. To this end, the autonomous driving system controls, inter alia, all or some of the various components of the motor vehicle likely to affect its trajectory or its speed, and in particular steering components, braking components and engine or transmission components.

In order to be able to implement this control automatically, without endangering the lives of the occupants of the vehicle or those of other road users, the vehicle is equipped with a set of sensors and one or more computers capable of processing the data acquired by these sensors in order to estimate the environment in which the vehicle is traveling. The autonomous driving system thus controls the various components mentioned based on a route instruction and on this estimate of the environment in order to bring its passengers to their destination while guaranteeing their safety and that of others.

The set of sensors available in a vehicle generally comprises a camera capable of acquiring images of all or part of the road scene. This type of sensor is valuable given the high image resolutions and acquisition frequency that it is capable of offering. On the other hand, this sensor has a significant drawback, specifically its relationship with the illumination of the road scene. Indeed, it is necessary for the road scene to be sufficiently illuminated so that objects present in this scene are able to be detected by the image processing software used in the one or more computers of the autonomous driving system. In the absence of sufficient lighting, an object might not be detected, which would be particularly harmful if this object is a road user or an obstacle toward which the vehicle is heading.

There is thus a need for lighting that makes it possible to maximize the probability of an object on the road being able to be detected based on an image of the road scene acquired by the camera of the vehicle.

Now, although motor vehicles are generally equipped with road lighting systems, usually comprising a pair of headlamps, these lighting systems emit light beams whose emission zones on the road and photometries in these emission zones are intended to help the driver to perceive objects. On the other hand, these light beams are absolutely not optimized for a camera, and their emission zones and/or their photometries in these zones might not be sufficient or suitable to allow the detection of an object in an image acquired by this camera.

The present invention thus falls within this context and aims to meet the cited need by proposing a solution capable of producing, from a motor vehicle, illumination of the road that is different from that obtained using existing lighting beams, and that makes it possible to maximize the probability of an object on the road being able to be detected based on an image of the road scene acquired by a camera of the vehicle.

For these purposes, one subject of the invention is a method for controlling a lighting system for a motor vehicle equipped with an object detection system comprising a system for acquiring images of all or part of the environment of the vehicle, the method comprising the following steps:

a. Defining at least one set of types of objects intended to be detected by the detection system of the motor vehicle,
b. The detection system acquiring a dataset relating to the position, in the environment of the vehicle, of a plurality of objects of types belonging to said set,
c. Determining, based on the dataset, a lighting model associated with said set defining at least one zone, called initial detection zone, associated with this set of types of objects and able to be addressed by the lighting system, and a photometry, called initial photometry, of a light beam intended to be emitted by the lighting system in the initial detection zone associated with this set,
d. Controlling the lighting system on the basis of the determined lighting model so as to emit a light beam having the initial photometry in the initial detection zone of this lighting model.

The invention thus proposes to collect data relating to the position of objects on the road, classified into at least one set of types of objects, and in particular multiple sets of types of objects, which is defined beforehand. These data make it possible to describe at least one zone in which any new object, belonging to one of the types of this or these sets, which will be detected by the detection system of the motor vehicle will be likely to be present. However, each of these sets of types of objects may require lighting characteristics specific to this set, in particular due to the ability of these types of object to reflect light that they receive to the detection system or else due to the ability of these types of objects to contrast with the rest of the road scene depending on the light that they receive. It is thus possible to define, for each set of types of objects, a photometry that makes it possible to maximize the probability of an object of this type actually being detected by the detection system. The lighting able to be emitted by the lighting system may thus be segmented into light beams, each light beam being emitted in one of said initial detection zones with its own photometry dedicated to the types of objects likely to appear in this zone. It will therefore be understood that the zones and the dedicated photometries are thus intended entirely to support the image acquisition system, and not intended for the driver of the motor vehicle. These light beams are thus “default” light beams, emitted prior to any detection that will then be carried out by the detection system. Each detection of an object, in an initial detection zone, carried out by the detection system may then lead to a modification of the light beam emitted in this zone, for example for the purpose of tracking the object or not dazzling the object.

For example, the image acquisition system may be a camera able to acquire images of a road scene ahead of or behind the motor vehicle or, as a variant, one or more cameras able to acquire images of the road scene all around the motor vehicle. Where applicable, the detection system may comprise one or more processing units designed to implement image processing algorithms on the images acquired by the image acquisition system in order to detect objects, in particular objects of said types of the set of types, in said images. If desired, the detection system may comprise one or more additional sensors, in particular a laser scanner, a radar or an infrared sensor, and possibly a processing unit designed to implement data fusion algorithms on data from the image acquisition system and this or these other sensors.

Advantageously, the dataset relating to the position of the objects may be acquired beforehand in daytime conditions.

In one embodiment of the invention, the dataset relating to the position of the objects, acquired in the acquisition step, comprises, for each object, the position, called initial position, of this object at the time when it was detected by the detection system.

Preferably:

a. the definition step comprises defining a plurality of separate sets of types of objects;

b. the acquisition step comprises acquiring, for each set, a dataset relating to the position, in the environment of the vehicle, of a plurality of objects of types belonging to said set;

c. the determination step comprises determining, based on each dataset, a lighting model associated with said set associated with this dataset, each model defining at least one zone, called initial detection zone, associated with this set of types of objects and able to be addressed by the lighting system, and a photometry, called initial photometry, of a light beam intended to be emitted by the lighting system in the initial detection zone associated with this set.

Where applicable, the control step comprises controlling the lighting system on the basis of said determined lighting models so as to emit, in particular simultaneously, a plurality of light beams, each light beam having the initial photometry in the initial detection zone of one of these lighting models. The set of light beams thus forms a segmented overall light beam. A set of types of objects is understood to mean in particular a group of at least one type of object, in particular of multiple types of objects having lighting requirements, reflection coefficients, dynamic behaviors and/or geometric characteristics that are substantially identical or similar. A set of types of object may for example comprise:

a. various types of traffic signs and traffic lights;

b. various types of road users, and in particular pedestrians, cyclists, vehicles; and also various types of animals;

c. various types of ground markings and obstacles likely to be reached by the vehicle in a time less than a given threshold, for example two seconds.

Advantageously, the step of determining said model comprises, for each type of object of said set, a step of modeling, based on the dataset, a zone, called first detection zone of said type of object, encompassing all of the initial positions of the objects of said type of object. Where applicable, said initial detection zone is determined based on the first detection zones of all of the types of objects of said set. Preferably, the step of determining said model may comprise, for each type of object of said set, a step of modeling, based on the dataset associated with this set, a zone, called first detection zone of said type of object, encompassing all of the initial positions of the objects of said type of object. Where applicable, each initial detection zone is determined based on the first detection zones of all of the types of objects of one and the same set. For example, the or each initial detection zone may be formed from the combination of all of the first detection zones of all of the types of objects of the or of one and the same set.

In one embodiment of the invention, each step of modeling the first detection zone of a type of object implements a machine learning algorithm, making it possible to determine the first detection zone based on the initial positions of the objects of said type of object. For example, said machine learning algorithm may comprise, without limitation, a learning algorithm trained with or without supervision, for example of the type: linear or non-linear regression, naive Bayes classifier, support vector machine or neural network, a K-means algorithm.

For example, in the case of a plurality of different sets of types of objects, the machine learning algorithm may be trained to determine, based on a plurality of datasets each comprising initial positions, in the environment of the vehicle, from a plurality of objects of types belonging to one of said sets, a first detection zone for each type of object, such that the initial detection zones, each formed by the combination of all of the first detection zones of the types of objects of one and the same set, are disjoint.

According to one non-limiting example, the machine learning algorithm may be trained to determine, for each type of object, a border of a zone such that the probability of an object of said type of object being detected therein is greater than a given threshold and/or such that the probability of an object of a type other than said type of object being detected therein is less than a given threshold. Where applicable, each threshold may be different for each type of object.

Advantageously, in the step of determining said model, said initial photometry of the light beam is determined on the basis of at least one of the types of objects of the set of types of objects. Preferably, in the step of determining said model, said initial photometry of the light beam is determined on the basis of the first detection zones of each of the types of objects of the set of types of objects, and in particular on the basis of the position of each first detection zone in the environment of the motor vehicle.

In one exemplary embodiment of the invention, the method comprises a step of providing at least one range of values of a parameter relating to the behavior of the motor vehicle or to the environment. Where applicable, the step of determining the lighting model associated with said set is a step of determining a lighting model, associated with said set, that is variable on the basis of said values of the parameter.

For example, the parameter relating to the behavior of the motor vehicle may be the speed of the motor vehicle and/or the trajectory of the motor vehicle and/or the yaw of the motor vehicle. For example, the parameter relating to the environment of the motor vehicle may be the meteorological conditions and/or the profile of the road, and in particular its curvature and/or its slope, and/or a datum regarding the position of the motor vehicle, in particular a GPS (Global Positioning System) datum.

A variable lighting model is understood to mean a lighting model whose initial detection zone has a shape, dimensions and/or a position in the environment of the vehicle that is variable on the basis of the value of said parameter and/or whose initial photometry is variable on the basis of the value of said parameter. In other words, the variable lighting model defines a plurality of initial detection zones and/or initial photometries associated with one and the same set of object types and each associated with a given value of said range of values of said parameter.

Advantageously, the step of determining said model comprises, for each type of object of said set and for each value of said range of values of said parameter, a step of modeling, based on the dataset, a first detection zone of said type of object, encompassing all of the initial positions of the objects of said type of object for which the parameter had said value when this initial position was acquired. Where applicable, each of the initial detection zones associated with one and the same set of types of objects is determined based on the first detection zones of all of the types of objects of said set that are associated with one and the same value of said parameter.

In one exemplary embodiment of the invention:

a. the definition step comprises defining at least three sets of types of objects including a first set comprising at least objects of ground marking type, a second set comprising at least objects of road user type and a third set comprising at least objects of traffic sign type, b. the determination step comprises determining three lighting models each associated with one of the sets, including a first lighting model associated with the first set, a second lighting model associated with the second set and a third lighting model associated with the third;

c. and the step of controlling the lighting system comprises controlling the lighting system on the basis of the determined lighting models so as to emit, in particular simultaneously, a first light beam having the initial photometry of the first lighting model in the initial detection zone of this first model, a second light beam having the initial photometry of the second lighting model in the initial detection zone of this second model and a third light beam having the initial photometry of the third lighting model in the initial detection zone of this third model.

In this example, the initial detection zone determined for the first model may be a bottom zone, the initial detection zone determined for the second model may be a central zone and the initial detection zone determined for the third model may be a top zone.

Advantageously, the method furthermore comprises the following steps:

a. The object detection system of the vehicle detecting an object of a given type from among said set of types of objects, b. Controlling the lighting system so as to modify the light beam on the basis of type of the detected object.

According to the invention, the light beam has, in the initial detection zone, an initial photometry suitable for helping the object detection system to detect the appearance of objects of a given type. However, the motor vehicle and/or the detected object may move and cause a movement of the detected object in the reference frame of the image acquisition system. The initial photometry, although suitable during the initial detection of this object, may thus no longer be suitable subsequently due to this movement. This feature thus makes it possible to adapt the initial photometry to the type of object and to its possible movement, such that the detection performance of the object detection system is able to be maintained after the initial detection of the object. Where applicable, the step of detecting the object of the given type may comprise a sub-step of estimating the position of this object.

Advantageously, the step of controlling the lighting system comprises a step of generating a zone in the light beam level with the detected object, the zone having a photometry adapted to the type of the detected object, and a step of moving said zone on the basis of the movement of the detected object in the reference frame of the image acquisition system. A "zone having an adapted photometry" is understood to mean a zone whose dimensions, shape, position in the road scene and/or photometry is adapted to the type of the detected object. For example, in the case of detection of an object of "motor vehicle" type, the zone may be a zone centered on the detected vehicle and whose light intensity is less than a given dazzling threshold. In the case of detection of an object of "pedestrian" type, the zone may be a zone centered on the detected pedestrian and whose light intensity is greater than a given detection threshold.

In one embodiment of the invention, the motor vehicle is equipped with a system for partially or fully autonomous driving. Where applicable, the implementation of the step of controlling the lighting system is conditional on the activation of the autonomous driving system, and the method comprises the following steps:

a. An occupant of the vehicle receiving an instruction to take back manual control of the motor vehicle, b. Controlling the lighting system so as to emit at least one predetermined regulatory lighting and/or signaling beam.

Said predetermined regulatory lighting and/or signaling beam may be for example a regulatory dipped beam or a regulatory high beam. Advantageously, the control step may comprise a sub-step of turning off the light beam having the initial photometry in the initial detection zone.

Another subject of the invention is a motor vehicle, comprising an object detection system comprising a system for acquiring images of all or part of the environment of the vehicle, a lighting system, a system for partially or fully autonomous driving, and a controller for the lighting system, the controller being designed to implement the control step of the method according to the invention.

Another subject of the invention is a lighting system for a motor vehicle according to the invention.

Advantageously, the lighting system comprises at least one lighting module able to emit a pixelated light beam and a controller able to receive an instruction to emit a given light function and designed to control the lighting module so as to emit a pixelated lighting beam having determined characteristics on the basis of said instruction.

According to one exemplary embodiment of the invention, the lighting module is designed such that the pixelated light beam is a light beam comprising a plurality of pixels, for example 500 pixels of dimensions between 0.05° and 0.3°, distributed over a plurality of rows and columns, for example 20 rows and 25 columns. For example, the lighting module may comprise a plurality of elementary light sources and an optical device that are designed to emit said pixelated light beam together. Where applicable, the controller may be designed to selectively control each of the elementary light sources of the lighting module so that this light source emits an elementary light beam forming one of the pixels of the pixelated light beam. A light source is understood to mean any light source possibly associated with an electro-optical element, capable of being selectively activated and controlled so as to emit an elementary light beam the light intensity of which is controllable. This may in particular be a light-emitting semiconductor chip, a light-emitting element of a monolithic pixelated light-emitting diode, a portion of a light-converting element able to be excited by a light source or else a light source associated with a liquid crystal or with a micromirror.

Figure 2:
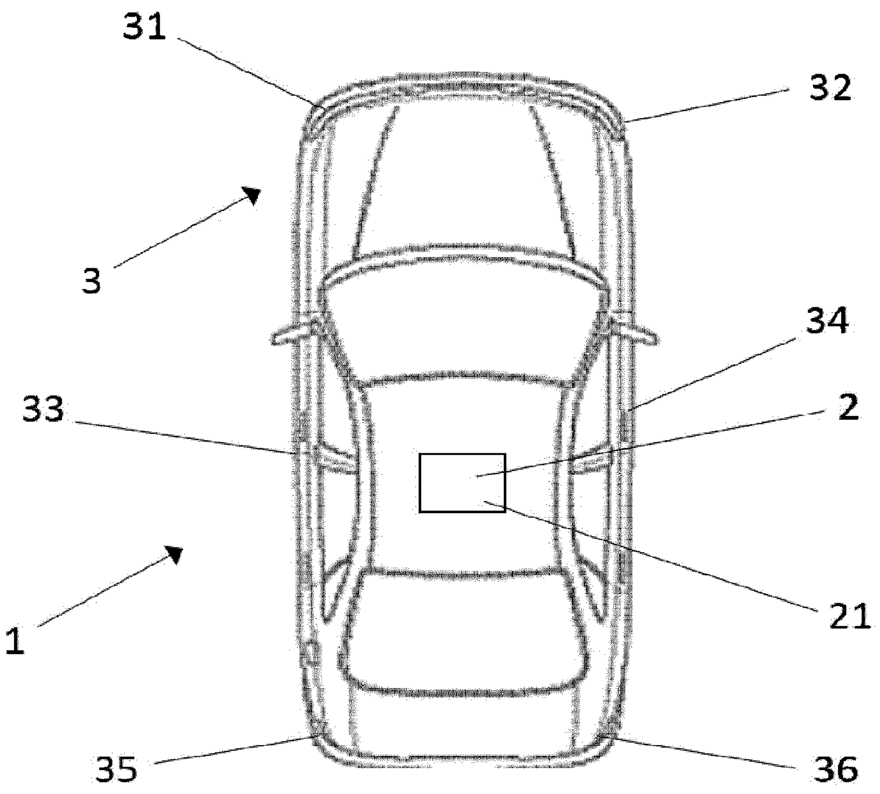
Figure 3:
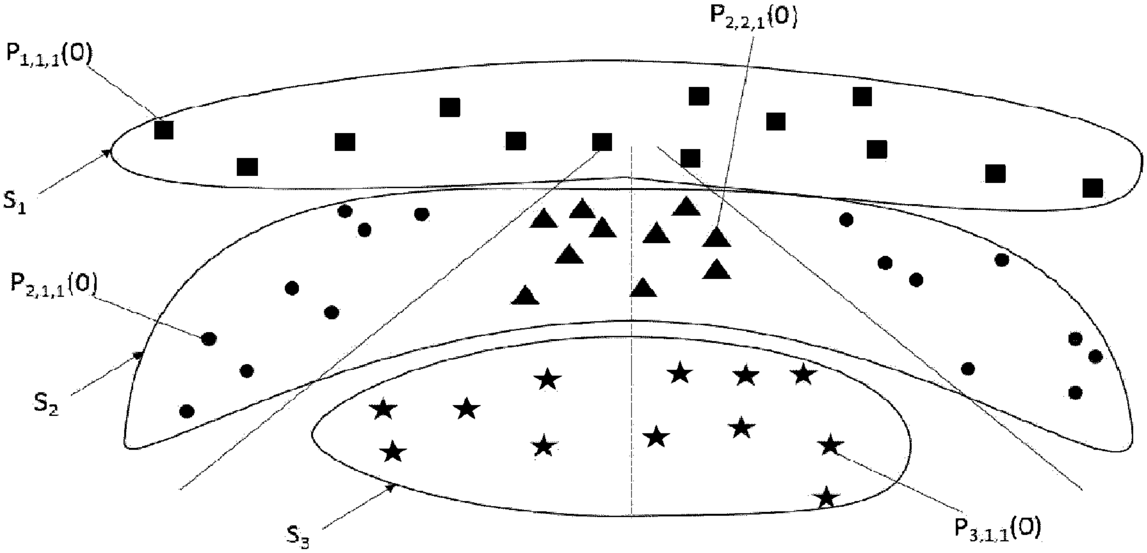
Figure 4:
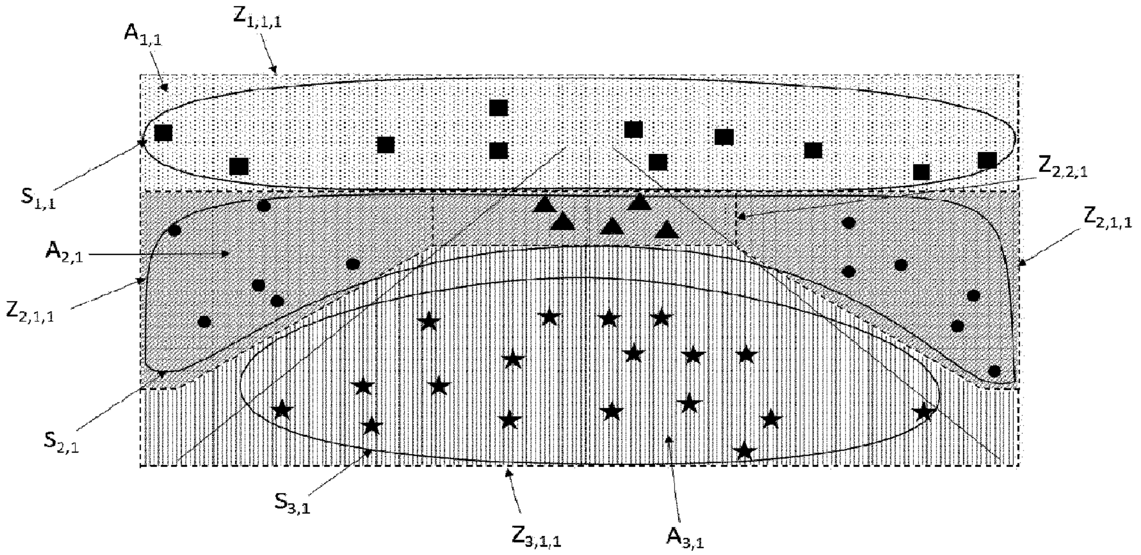
Figure 5:
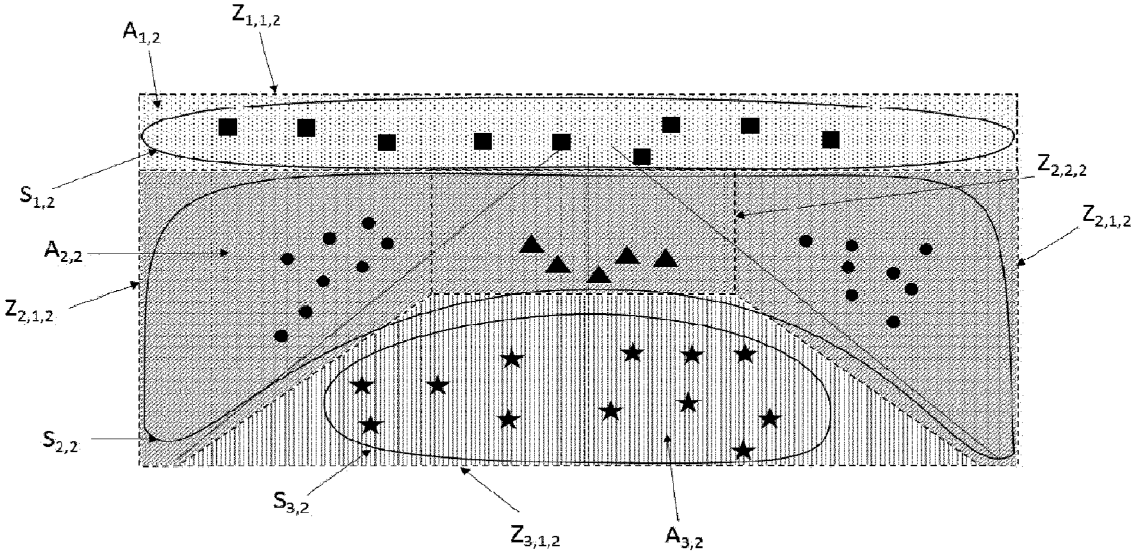
Figure 6:
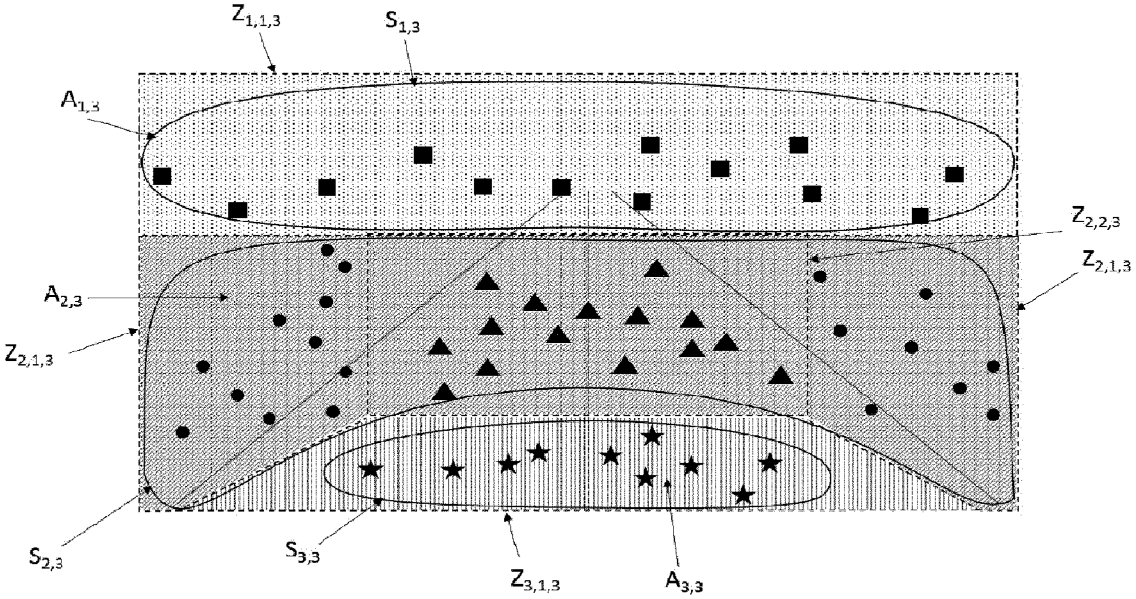
Figure 7:
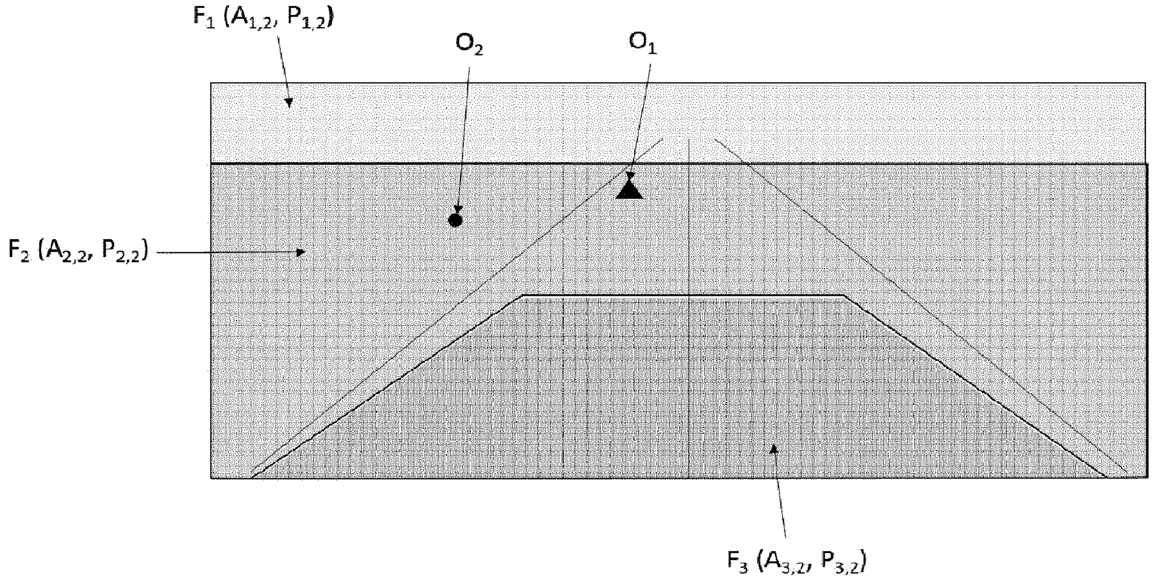
Figure 8:
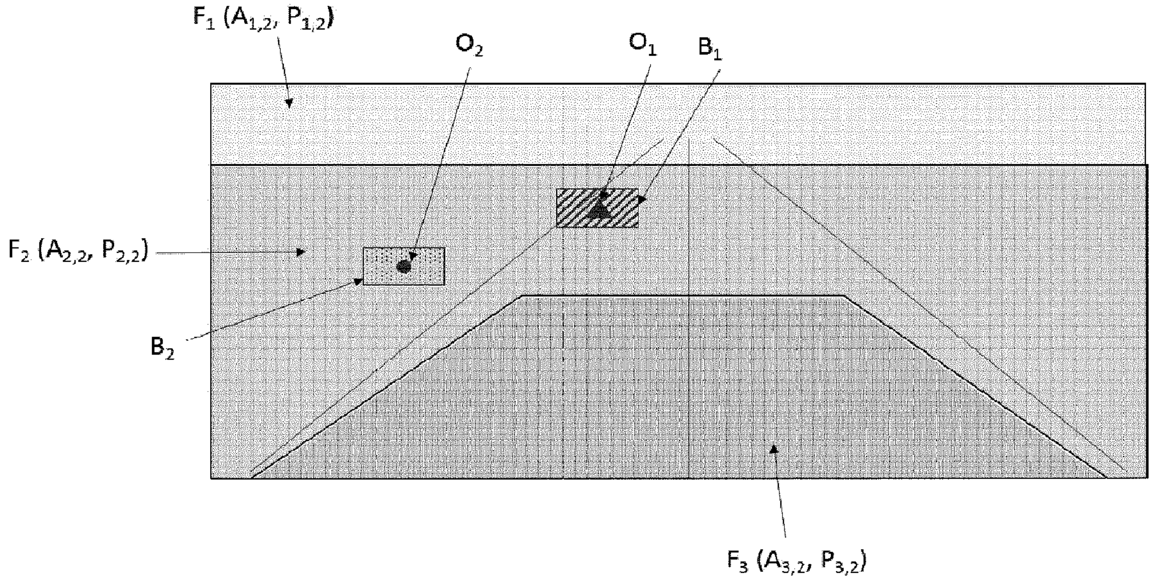

The present invention is now described using examples that are only illustrative and in no way limit the scope of the invention, and with reference to the appended drawings, in which drawings, in the various figures:

FIG. 1 schematically and partially shows a method for controlling a lighting system for a motor vehicle according to one embodiment of the invention;

FIG. 2 schematically and partially shows a motor vehicle according to one exemplary embodiment of the invention;

FIG. 3 schematically and partially shows datasets for implementing the method of FIG. 1;

FIG. 4 schematically and partially shows the implementation of a step of the method of FIG. 1;

FIG. 5 schematically and partially shows the implementation of a step of the method of FIG. 1;

FIG. 6 schematically and partially shows the implementation of a step of the method of FIG. 1;

FIG. 7 schematically and partially shows the implementation of a step of the method of FIG. 1; and FIG. 8 schematically and partially shows the implementation of a step of the method of FIG. 1.

In the following description, elements that are identical in structure or in function and appear in various figures keep the same reference sign, unless otherwise stated.

[FIG. 1] describes a method for controlling a lighting system 3 fora motor vehicle 1 according to one embodiment of the invention.

The motor vehicle 1, shown in [FIG. 2], comprises an object detection system 2. This detection system 2 comprises an image acquisition system 21.

This system 21 comprises a camera able to acquire images of the road scene all around the motor vehicle 1. The detection system 2 also comprises a processing unit (not shown) designed to implement image processing algorithms on the images acquired by the camera 21 in order to detect objects in said images.

The motor vehicle 1 comprises a lighting system 3, comprising a plurality of lighting modules 31 to 36, each able to emit a pixelated light beam in a given direction, the lighting system 3 thus being able to illuminate the road all around the motor vehicle 1.

The motor vehicle 1 comprises a controller for the lighting system 3, able to selectively control each of the lighting modules 31 to 36 and to selectively control each of the pixels of the pixelated light beams able to be emitted by these lighting modules 31 to 36.

The motor vehicle 1 comprises a system for fully autonomous driving that is designed, when the motor vehicle is in an autonomous driving mode, to control the steering components, the braking components and the engine or transmission components of the motor vehicle, in particular on the basis of the objects detected by the processing unit of the detection system 2 in the images acquired by the camera 21.

In the remainder of the description, the method of [FIG. 1] will be a method for controlling the lighting modules 31 and 32, and will be described in conjunction with [FIG. 3] to [FIG. 8], which each show a road scene ahead of the vehicle, as may be seen by the camera 21 and as may be illuminated by the lighting modules 31 and 32, it being understood that the method is also implemented for road scenes to the side of and behind the vehicle by controlling the lighting modules 33 to 36.

In a step E1, a plurality of sets of types of objects $G_1$ to $G_N$ will have been defined beforehand, each set Gi grouping together one or more types of objects $T_{i,j}$. In the example described, this step E1 is simplified by defining a first set $G_1$ of types of objects $T_{1,1}$ grouping together traffic signs, a second set $G_2$ of types of objects $T_{2,1}$ and $T_{2,2}$ grouping together pedestrians and vehicles, respectively, and a third set $G_3$ of types of objects $T_{3,1}$ grouping together ground markings and obstacles likely to be reached by the vehicle in a time less than two seconds. In the figures, objects of the type $T_{1,1}$ will be represented by squares, objects of the type $T_{2,1}$ will be represented by circles, objects of the type $T_{2,2}$ will be represented by triangles and objects of the type $T_{3,1}$ will be represented by stars.

In a step E2, a plurality of datasets $S_1$ to $S_N$ is acquired. Each datum $P_{i,j,k}$ of a dataset $S_i$ represents a set of positions of an object $O_{i,j,k}$ of a type $T_{i,j}$ belonging to a set $G_i$, estimated by a detection system of a motor vehicle, similar to the detection system 2 and comprising a camera similar to the camera 21. This set of positions $P_{i,j,k}$ groups together all of the positions of this object $O_{i,j,k}$ from an initial position $P_{i,j,k}(0)$ of this object, estimated at the time when it was detected by the detection system in the field of the camera, up to a final position, estimated at the last time before the disappearance of the object from the field of the camera.

[FIG. 3] shows a simplified example of the datasets $S_1$ to $S_3$, relating to the sets $G_1$ to $G_3$, the initial positions $P_{i,j,k}$ of the data of these datasets being projected onto a road scene ahead of a motor vehicle.

Each dataset $S_i$ furthermore comprises, for each datum $P_{i,j,k}$ of this set representing a set of positions of an object, the speed $V_{i,j,k}$ of the motor vehicle when the set of positions of this object was estimated.

In a preliminary step E1', in parallel with the definition step E1, multiple speed ranges $\Delta V_1$ to $\Delta V_M$ were defined.

In a step E3, each of the datasets $S_1$ to $S_N$ is split into a plurality of sub-datasets $S_{1,1}$ to $S_{N,M}$, each datum $P_{i,j,k}$ of a dataset $S_i$ being assigned to a subset $S_{i,l}$ if the speed $V_{i,j,k}(0)$ of the motor vehicle, at the time of acquisition of the initial position $P_{i,j,k}(0)$ of the object $O_{i,j,k}$, is within the range $\Delta V_l$. In other words, the subset $S_{i,l}$ contains all of the initial positions $P_{i,j,k}(0)$ of the objects $O_{i,j,k}$ whose type $T_{i,j}$ belongs to the set G, and whose initial speed $V_{i,j,k}(0)$ is within the range $\Delta V_l$.

In a step E4, for each type of object $T_{i,j}$ of each set Gi and for each speed range $\Delta V_l$, a zone $Z_{i,j,l}$, called first detection zone of this type of object, is modeled. This zone $Z_{i,j,l}$ encompasses all of the initial positions $P_{i,j,k}(0)$ of the objects $O_{i,j,k}$ of the type of object $T_{i,j}$ and whose initial speed $V_{i,j,k}(0)$ is within the range $\Delta V_l$.

For these purposes, a support vector machine has been trained beforehand to determine, with supervision and based on a plurality of points labeled with different labels and positioned in a space, for each label, a border of a zone such that the number of points labeled with this label and present in this zone is greater than a given threshold and such that the number of points labeled with a label other than this label and present in this zone is less than a given threshold.

In step E4, each of the sub-datasets $S_{i,l}$ for one and the same range $\Delta V_l$ is then provided at input of the previously trained support vector machine, along with thresholds for each type of object and for each range, so as to determine first detection zones $Z_{i,j,l}$ of the objects of type $T_{i,j}$. Each zone $Z_{i,j,l}$ thus encompasses the initial positions $P_{i,j,k}(0)$ of the objects $O_{i,j,k}$ of the type of object $T_{i,j}$ and whose initial speed $V_{i,j,k}(0)$ is within the range $\Delta V_l$. It is furthermore noted that each zone $Z_{i,j,l}$ is thus modeled by the neural network such that the probability of an object $O_{i,j,k}$ of the type of object $T_{i,j}$ being detected therein, when the initial speed $V_{i,j,k}(0)$ is within the range $\Delta V_l$, is at a maximum and that the probability of an object $O_{i,j,k}$ of a type other than said type of object $T_{i,j}$, when the initial speed $V_{i,j,k}(0)$ is within the range $\Delta V_l$, being detected therein is at a minimum.

In a step E51, an initial detection zone $A_{i,l}$ is determined by combining the first detection zones $Z_{i,j,l}$ of the objects of type $T_{i,j}$ belonging to one and the same set $G_i$.

[FIG. 4] thus shows the sub-datasets $S_{1,1}$, $S_{2,1}$ and $S_{3,1}$ for initial speeds between 90 and 130 km/h. [FIG. 4] also shows the zones $Z_{2,1,1}$, $Z_{2,2,1}$ and $Z_{3,1,1}$, associated respectively with the types $T_{2,1}$, $T_{2,2}$ and $T_{3,1}$ determined at the end of step E51 and the zones $A_{1,1}$, $A_{2,1}$ and $A_{3,1}$ determined at the end of step E52.

[FIG. 5] also shows the sub-datasets $S_{1,2}$, $S_{2,2}$ and $S_{3,2}$ for initial speeds between 50 and 90 km/h. [FIG. 5] also shows the zones $Z_{2,1,2}$, $Z_{2,2,2}$ and $Z_{3,1,2}$, associated respectively with the types $T_{2,1}$, $T_{2,2}$ and $T_{3,1}$ determined at the end of step E51 and the zones $A_{1,2}$, $A_{2,2}$ and $A_{3,2}$ determined at the end of step E52.

[FIG. 6] also shows the sub-datasets $S_{1,3}$, $S_{2,3}$ and $S_{3,3}$ for initial speeds between 0 and 50 km/h. [FIG. 6] also shows the zones $Z_{2,1,3}$, $Z_{2,2,3}$ and $Z_{3,1,3}$, associated respectively with the types $T_{2,1}$, $T_{2,2}$ and $T_{3,1}$ determined at the end of step E51 and the zones $A_{1,3}$, $A_{2,3}$ and $A_{3,3}$ determined at the end of step E52.

The zones $A_{1,1}$, $A_{1,2}$ and $A_{1,3}$ associated with the set Gi of traffic signs are zones located more in the upper part of the road scene, the zones $A_{2,1}$, $A_{2,2}$ and $A_{2,3}$ associated with the set $G_2$ of road users are zones located more in the center of the road scene, and the zones $A_{3,1}$, $A_{3,2}$ and $A_{3,3}$ associated with the set $G_3$ of objects in the immediate navigable space of the vehicle are zones located more in the lower part of the road scene. It may be seen that the shape, the dimensions and the positions in the space of the initial detection zones $A_{i,l}$ associated with one and the same set G, vary on the basis of the initial speed.

Each initial detection zone $A_{i,l}$ is a zone of the space in which the probability of an object, of type $T_{i,j}$ belonging to a set G, associated with this zone, being able to be detected by the detection system 2 based on an image acquired by the camera 21 is particularly high.

In a step E52, for each initial detection zone $A_{i,l}$ of objects of type $T_{i,j}$ belonging to one and the same set $G_i$, an initial photometry $P_{i,l}$ is determined that makes it possible to improve the detection performance of the detection system 2 taking into account the types of objects of this set $G_i$. Determining this initial photometry $P_{i,l}$ may comprise determining a minimum, average and/or maximum light intensity of a light beam intended to be emitted by the lighting system 3 in the initial detection zone $A_{i,l}$ or else determining a light intensity for a plurality of pixels, for a plurality of groups of pixels or even for all of the pixels of a light beam intended to be emitted by the lighting system 3 in the initial detection zone $A_{i,l}$.

For example, for the zones $A_{3,1}$, $A_{3,2}$ and $A_{3,3}$, the lighting emitted by the lighting modules 31 and 32 is substantially parallel to the ground. The back-reflection of this lighting to the camera 21 will therefore not be very intense, and so it is necessary for the average light intensity of a light beam emitted in these zones to be high in order to allow the detection of a marking or an obstacle in these zones. For the zones $A_{2,1}$, $A_{2,2}$ and $A_{3,3}$, the lighting emitted by the lighting modules 31 and 32 will be substantially perpendicular to a road user. This lighting will therefore be reflected satisfactorily to the camera 21, such that the average light intensity of a light beam emitted in these zones may be lower than that of a beam emitted in the zones $A_{3,1}$, $A_{3,2}$ and $A_{3,3}$. For the zones $A_{1,1}$, $A_{1,2}$ and $A_{1,3}$, the lighting emitted by the lighting modules 31 and 32 will be substantially perpendicular to a traffic sign. Since a traffic sign is generally provided with a reflective coating, this lighting will be reflected back in amplified form. It is therefore necessary for the average light intensity of a light beam emitted in these zones to be low so as not to saturate the sensors of the camera 21.

At the end of step E52, the set of initial detection zones $A_{i,l}$ and initial photometries $P_{i,l}$, for all of the ranges $\Delta V_1$ to $\Delta V_M$ and for one and the same set $G_i$, forms an lighting model $M_i$ associated with this set $G_i$.

It should be noted that steps E1 to E52 for determining these lighting models $M_1$ to $M_N$, for the sets $G_1$ to $G_N$, are produced by a computer unit, comprising a memory storing the sets $G_1$ to $G_N$ and the speed ranges $\Delta V_1$ to $\Delta V_M$ defined in steps E1 and E1', along with the datasets Si to S N, and a processor able to implement these steps. The computer unit is separate from the motor vehicle 1, steps E1 to E52 thus being carried out prior to the following steps. At the end of step E52, the models $M_1$ to $M_N$ are loaded into a memory of the controller for the lighting system 3, for example in the form of images in which each pixel represents a pixel of a pixelated light beam intended to be emitted by the modules 31 and 32, the grayscale level of the pixel of the image representing a light intensity setpoint for an elementary light beam able to be emitted by these modules 31 and 32 so as to form the pixel of the pixelated light beam.

In a step E6, when the motor vehicle 1 is in an autonomous driving mode, the lighting modules 31 and 32 of the lighting system 3 are controlled by the controller so as to emit, ahead of the vehicle, an overall light beam F formed of multiple light beams F, each conforming to one of the models $M_1$ to $M_N$. Since the speed of the motor vehicle is within one of the ranges $\Delta V_l$, each light beam $F_i$ is emitted in the initial detection zone $A_{i,l}$ with the initial photometry $P_{i,l}$. These light beams $F_1$ to $F_N$ are light beams that are emitted by default, in the absence of detection of an object on the road.

[FIG. 7] shows a road scene, illuminated by way of the beams $F_1$, $F_2$ and $F_3$, emitted simultaneously by the lighting modules 31 and 32, so as together to form a segmented overall light beam F. In the example of [FIG. 7], the motor vehicle is traveling at a speed between 50 and 90 km/h.

Steps E7 and E8, which will now be described, relate to the adaptation of the segmented overall beam F carried out following the detection of an object O, while step E9 relates to the vehicle switching from an autonomous driving mode to a manual driving mode.

In a step E7, an object $O_1$ is detected by the detection system 2, and is classified by this detection system 2 as being of a type $T_{2,1}$ belonging to a set G. Another object $O_2$ is detected by the detection system 2, and is classified by this detection system 2 as being of a type $T_{2,2}$ belonging to this set $G_2$. As shown in [FIG. 7], the object $O_1$ is a motor vehicle and the object $O_2$ is a pedestrian, these objects being located in the initial detection zone $A_{2,2}$. The objects $O_1$ and $O_2$ are thus illuminated by the beam F2, the photometry P2,2 of which makes it possible to improve the detection performance of these types of objects by the detection system 2.

In a step E8, following the detection of an object O, the controller controls the lighting system 3 so as to generate a zone B in the light beam, centered on the object O and having a photometry adapted to the type of this object O. In the example described, following the detection of the objects $O_1$ and $O_2$, the controller controls the modules 31 and 32 so as to generate, in the beam F2, a lower-intensity zone $B_1$, centered on the object $O_1$, and an over-intensified zone $B_2$, centered on the object $O_2$. The zone $B_1$ allows the detection system 2 to continue to detect the vehicle $O_1$ while it is moving and the movement of the vehicle 1, without however dazzling a possible driver of this vehicle. The zone $B_2$ allows the detection system 2 to continue to detect the pedestrian $O_2$ while the vehicle 1 is moving. The zones $B_1$ and $B_2$ thus remain centered on these objects $O_1$ and $O_2$ while they are moving in the field of the camera 21, the estimation of the position of these objects $O_1$ and $O_2$ at a given time allowing the controller to move the zones B 1 and $B_2$ at the next time, as shown in [FIG. 8], until the objects $O_1$ and $O_2$ leave the field of the camera. At the end of this step E8, the controller for the lighting system then controls the modules 31 and 32 so that the light beam F2 conforms to the default lighting model $M_2$.

In a step E9, when the autonomous driving system receives an instruction I to take back manual control of the motor vehicle 1, the controller controls the lighting system, and in particular the lighting modules 31 and 32, to gradually transform the overall light beam F into a regulatory dipped beam LB. If the autonomous driving system receives an instruction to switch the motor vehicle 1 to an autonomous mode, the controller then controls the lighting system 3 so as to emit $F_1$, $F_2$ and $F_3$, conforming to the models $M_1$, $M_2$ and $M_3$, respectively, using the lighting modules 31 and 32.

The above description clearly explains how the invention makes it possible to achieve the objectives that it set itself, and in particular by proposing a method for controlling a lighting system for a motor vehicle, wherein data relating to the position of objects, classified according to their types, make it possible to describe at least one zone in which any new object, belonging to one of these types, will be likely to be present, and wherein a photometry is defined that makes it possible to maximize the probability of an object of this type actually being detected by a detection system of the motor vehicle. By virtue of the invention, the light beams emitted by the lighting system are thus intended entirely to support the image acquisition system of the detection system.

In any event, the invention should not be regarded as being limited to the embodiments specifically described in this document, and extends, in particular, to any equivalent means and to any technically feasible combination of these means. It is possible in particular to envisage types of detection system other than the one described, and in particular systems combining an image acquisition system with other types of sensors, the position of objects on the road being detected and estimated for example through multi-sensor data fusion. It is also possible to envisage types of objects other than those described. It is also possible to envisage other examples of methods for modeling first detection zones, and in particular types of machine learning algorithm other than the one described. It is also possible to envisage modeling first detection zones on the basis of parameters other than the speed of the vehicle.

The invention claimed is:

1. A method for controlling a lighting system for a motor vehicle equipped with an object detection system comprising an image acquisition system for acquiring images of all or part of an environment of the motor vehicle, the method comprising:

defining at least one set of types of objects intended to be detected by the object detection system of the motor vehicle;

acquiring, via the object detection system, a dataset relating to a position, in the environment of the motor vehicle, of a plurality of objects of types belonging to said set;

determining, based on the dataset, a lighting model associated with said set defining at least one initial detection zone associated with the set of types of objects and able to be addressed by the lighting system, and an initial photometry of a light beam intended to be emitted by the lighting system in the initial detection zone associated with the set, wherein determining the lighting model comprises, for each type of object of the set, modeling, based on the dataset, a first detection zone of the type of object encompassing initial positions of objects of the type of object, and determining the initial detection zone based on the first detection zone of the types of objects of the set; and controlling the lighting system based on the determined lighting model to emit a light beam having the initial photometry in the initial detection zone of the lighting model.

2. The method as claimed in claim 1, wherein the dataset relating to the position of the objects comprises, for each object, an initial position of the object at a time when the object was detected by the object detection system.

3. The method as claimed in claim 2, wherein modeling the first detection zone of a type of object implements a machine learning algorithm to determine the first detection zone based on the initial positions of the objects of said type of object.

4. The method as claimed in claim 1, wherein, in determining the lighting model, said initial photometry of the light beam is determined based on at least one of the types of objects of the set of types of objects.

5. The method as claimed in claim 4, the method further comprising providing at least one range of values of a parameter relating to a behavior of the motor vehicle or to the environment, and wherein determining the lighting model associated with said set is a step of determining a lighting model, associated with said set, that is variable based on said values of the parameter.

6. The method as claimed in claim 1, further comprising:

defining at least three sets of types of objects including a first set comprising at least objects of ground marking type, a second set comprising at least objects of road user type and a third set comprising at least objects of traffic sign type;

determining three lighting models each associated with one of the at least three sets, including a first lighting model associated with the first set, a second lighting model associated with the second set and a third lighting model associated with the third set; and controlling the lighting system based on the determined lighting models to emit a first light beam having the initial photometry of the first lighting model in the initial detection zone of the first lighting model, a second light beam having the initial photometry of the second lighting model in the initial detection zone of the second lighting model and a third light beam having the initial photometry of the third lighting model in the initial detection zone of the third lighting model.

7. The method as claimed in claim 1, the method further comprising:

the object detection system of the motor vehicle detecting an object of a given type from among said set of types of objects; and controlling the lighting system to modify the light beam based on a type of the detected object.

8. The method as claimed in claim 7, wherein controlling the lighting system comprises generating a zone in a light beam level with the detected object, the zone having a photometry adapted to the type of the detected object, and moving said zone based on a movement of the detected object in a reference frame of the image acquisition system.

9. The method as claimed in claim 1, wherein the motor vehicle is equipped with an autonomous driving system for partially or fully autonomous driving, wherein an implementation of controlling the lighting system is conditional on an activation of the autonomous driving system, and the method further comprises:

receiving, by an occupant of the motor vehicle, an instruction to take back manual control of the motor vehicle; and controlling the lighting system to emit at least one predetermined regulatory lighting and/or signaling beam.

10. A motor vehicle comprising the object detection system comprising the image acquisition system for acquiring the images of all or part of the environment of the motor vehicle, the lighting system, an autonomous driving system for partially or fully autonomous driving, and a controller for the lighting system, the controller being configured to implement the method according to claim 1.

11. The method as claimed in claim 2, wherein, in determining the lighting model, said initial photometry of the light beam is determined based on at least one of the types of objects of the set of types of objects.

12. The method as claimed in claim 2, further comprising:

defining at least three sets of types of objects including a first set comprising at least objects of ground marking type, a second set comprising at least objects of road user type and a third set comprising at least objects of traffic sign type;

determining three lighting models each associated with one of the at least three sets, including a first lighting model associated with the first set, a second lighting model associated with the second set and a third lighting model associated with the third set; and controlling the lighting system based on the determined lighting models se as to emit a first light beam having the initial photometry of the first lighting model in the initial detection zone of the first lighting model, a second light beam having the initial photometry of the second lighting model in the initial detection zone of the second lighting model and a third light beam having the initial photometry of the third lighting model in the initial detection zone of the third lighting model.

13. The method as claimed in claim 2, the method further comprising:

detecting, via the object detection system of the motor vehicle, an object of a given type from among said set of types of objects; and controlling the lighting system to modify the light beam based on a type of the detected object.

14. The method as claimed in claim 2, wherein the motor vehicle is equipped with an autonomous driving system for partially or fully autonomous driving, wherein controlling the lighting system is conditional on an activation of the autonomous driving system, and the method further comprises:

receiving, by an occupant of the motor vehicle, an instruction to take back manual control of the motor vehicle; and controlling the lighting system to emit at least one predetermined regulatory lighting and/or signaling beam.

15. The method as claimed in claim 2, wherein, in determining the lighting model, said initial photometry of the light beam is determined based on at least one of the types of objects of the set of types of objects.

16. The method as claimed in claim 2, further comprising:

defining at least three sets of types of objects including a first set comprising at least objects of ground marking type, a second set comprising at least objects of road user type and a third set comprising at least objects of traffic sign type;

determining three lighting models each associated with one of the sets, including a first lighting model associated with the first set, a second lighting model associated with the second set and a third lighting model associated with the third set; and controlling the lighting system based on the determined lighting models se as to emit a first light beam having the initial photometry of the first lighting model in the initial detection zone of the first lighting model, a second light beam having the initial photometry of the second lighting model in the initial detection zone of the second lighting model and a third light beam having the initial photometry of the third lighting model in the initial detection zone of the third lighting model.

17. The method as claimed in claim 2, the method further comprising:

detecting, via the object detection system of the motor vehicle, an object of a given type from among said set of types of objects; and controlling the lighting system se as to modify the light beam based on a type of the detected object.

18. The method as claimed in claim 2, wherein the motor vehicle is equipped with an autonomous driving system for partially or fully autonomous driving, wherein controlling the lighting system is conditional on an activation of the autonomous driving system, and the method further comprises:

receiving, by an occupant of the motor vehicle, an instruction to take back manual control of the motor vehicle; and controlling the lighting system to emit at least one predetermined regulatory lighting and/or signaling beam.

19. The method as claimed in claim 3, wherein, in determining the lighting model, said initial photometry of the light beam is determined based on at least one of the types of objects of the set of types of objects.

* * * * *